United States Patent
Deaconu

(10) Patent No.: US 10,158,581 B2
(45) Date of Patent: Dec. 18, 2018

(54) SELECTIVE STEERING OF MEDIA DATA STREAMS

(71) Applicant: Telefonaktiebolaget LM Ericsson (publ), Stockholm (SE)

(72) Inventor: Florin Alexandru Deaconu, Eschweiler (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 215 days.

(21) Appl. No.: 15/036,493

(22) PCT Filed: Nov. 15, 2013

(86) PCT No.: PCT/EP2013/073988
§ 371 (c)(1),
(2) Date: May 13, 2016

(87) PCT Pub. No.: WO2015/070922
PCT Pub. Date: May 21, 2015

(65) Prior Publication Data
US 2016/0308779 A1    Oct. 20, 2016

(51) Int. Cl.
| | | |
|---|---|---|
| *G06F 15/16* | (2006.01) | |
| *H04L 12/911* | (2013.01) | |
| *H04L 12/803* | (2013.01) | |
| *H04L 29/06* | (2006.01) | |

(52) U.S. Cl.
CPC .......... *H04L 47/726* (2013.01); *H04L 47/122* (2013.01); *H04L 47/125* (2013.01);
(Continued)

(58) Field of Classification Search
USPC ....... 709/229, 249, 203, 206, 217, 219, 223, 709/224, 226, 228, 230, 232, 238;
(Continued)

(56) References Cited

U.S. PATENT DOCUMENTS 6,711,159 B1 * 3/2004 Grabelsky ............. H04L 47/125
    709/249
7,881,325 B2 * 2/2011 Cheethirala ........... H04L 47/125
    370/235
(Continued)

FOREIGN PATENT DOCUMENTS

EP    2141864 A1    1/2010
WO    2010034539 A1    4/2010

OTHER PUBLICATIONS

Wikipedia, "Load Balancing (computing)", Downloaded from the Internet on Jan. 16, 2017, originally published Jul. 25, 2013, pp. 1-6.

*Primary Examiner* — Quang N Nguyen
(74) *Attorney, Agent, or Firm* — Murphy, Bilak & Homiller, PLLC

(57) ABSTRACT

The invention relates to a method, by a control node (100, 150), for selecting one of a plurality of media forwarding elements (200, 250) in a network for forwarding an additional media data stream by the selected media forwarding element, the method comprising the steps of receiving (S21, S31, S100) a load message from one of the media forwarding elements, the load message containing information about a load level of said one media forwarding element and about how media data streams from a first area (300) of the network from which said one media forwarding element receives the media data streams contribute to the load level of said one media forwarding element. The received information is stored in a storage unit (130) of the control node. When a setup request for an additional media data stream is received, the setup request requesting a selection of one of the media forwarding elements for the second media data stream by the control node (100, 150). One of the media forwarding elements is selected for the additional media data stream taking into account the stored information, wherein, for the selection, it is checked based on the stored informa- (Continued)

tion whether the set up request for the additional media data stream is relating to a media data stream from the first area (300), wherein, if the second media data stream is relating to a media data stream from the first area (300), said one media forwarding element is excluded (S23, S105) from the selection of the media forwarding element for the additional media data stream.

16 Claims, 12 Drawing Sheets

(52) U.S. Cl.
CPC .......... *H04L 47/745* (2013.01); *H04L 65/103* (2013.01); *H04L 65/1043* (2013.01); *H04L 65/60* (2013.01)

(58) Field of Classification Search
USPC .................. 370/235, 252, 384, 401; 455/436
See application file for complete search history.

(56) References Cited

U.S. PATENT DOCUMENTS

| | | | |
|---|---|---|---|
| 8,842,536 B2* | 9/2014 | Gupta | H04L 47/10 370/230 |
| 2002/0035699 A1* | 3/2002 | Crosbie | H04L 63/10 709/229 |
| 2004/0240389 A1* | 12/2004 | Bessis | H04L 47/10 370/252 |
| 2006/0140198 A1* | 6/2006 | Majeed | H04Q 3/0025 370/401 |
| 2007/0297399 A1* | 12/2007 | Prytz | H04W 48/18 370/384 |
| 2012/0155297 A1 | 6/2012 | Russell et al. | |
| 2012/0163175 A1* | 6/2012 | Gupta | H04L 47/10 370/235 |
| 2014/0128073 A1* | 5/2014 | Farhadi | H04W 16/16 455/436 |

* cited by examiner

SELECTIVE STEERING OF MEDIA DATA STREAMS

TECHNICAL FIELD

The invention relates to a method, by a control node, for selecting one of a plurality of media forwarding elements for forwarding an additional media data stream and to the corresponding control node. The invention furthermore relates to the media forwarding element forwarding the media data stream and to a method for forwarding the media data stream.

BACKGROUND

In FIG. 1, a current network architecture for the transport of media data streams is shown in which Media GateWays (MGW) 20, 21 transport a media payload/a media data stream between various sources and destinations, such as the payload transport nodes 30, 31, which could be also the payload sources and destinations. The control of the media data stream is handled by the Media Gateway Controllers 10, 11 (MGC) or other control nodes of the network. In the embodiment of FIG. 1, the dashed lines show the transport of control data whereas the solid lines show the transport of the media payload.

With the introduction of very high-capacity interfaces such as 1 GE (Gigabit Ethernet port) or 10 GE interfaces at the moment and with 40 GE or 100 GE in the future, the potential problem occurs that instead of the transport links, i.e. the connections between the media gateways, the media gateway or the IP network switch in a Software-Defined Network (SDN) is gradually becoming the network bottleneck.

The MGW can be located in wireline, 2G/3G mobile or IMS (IP Multimedia Subsystem)/VoIP (Voice over IP)/LTE (Long Term Evolution) networks As a result of a congestion at the media gateway, the node will not be able to process new incoming traffic, will take longer to answer any requests meaning that the call or session setup time will increase to unacceptable levels. Furthermore, the ongoing traffic will be affected as the media gateway starts to lose packets belonging to ongoing calls/sessions.

WO 2010/034539 discloses a method for receiving a congestion indication for resources on a route to a target through a first network type. When a subsequent setup request for a call in the route is received, it is checked whether a congestion indication exists for the route. If yes, the call is established on an alternative route through a second type network.

The existing congestion control mechanisms are focusing on congestions in the transport or signaling network. When the media gateway itself is congested, the affected media gateway will report back to the media gateway controller the lack of available resources and the percentage of congestion level. Based on the received information, the media gateway controller will avoid the selection of the congested media gateway following a selection algorithm that is influenced, among other factors, by the reported congestion level. Looking at the node congestion case, the media gateway reports an error message 510 over ITU-T H.248 protocol, which means that a received command is rejected due to a lack of common resources in the media gateway. The error text in the error descriptor includes the name or identity of the property, signal or event that represents a lacking of resources in the media gateway.

As a result the controlled media gateway and the media gateway controller are not able to discern or pinpoint the reason of the congestion and the media gateway will process less traffic independent of the fact whether or not the source of the new traffic was a significant contributor to the congestion in the node.

With the high capacity interfaces mentioned above of 1-10 GE with a higher capacity being expected in the future, it is less and less unlikely that an interface will become congested before the node will be. As a consequence, the bottleneck is moved from the transport network into the node that handles the transport.

In the existing solutions the focus is to protect the media gateway and the ongoing calls or sessions of media data streams for a certain period of time or to restrict the volume of traffic handled by the media gateway with the hope that the peak period will pass and that the traffic volume in the media data stream will decrease.

In most of the cases, however, the source of the congestion will continue to generate a high volume of traffic. This gradually leads to similar congestion situations in the other media gateways connected to the same source and the involved additional network nodes become congested as well. The media gateway controller's selection algorithm will not be able to cope with the situation and will begin to act as if none of the media gateways were congested: each media gateway from the group will receive an equal amount of new calls as there are no alternative destinations available. This leads to a network with reduced call processing capacity, with a high number of unsuccessful call/session attempts, with significantly increased call/session setup times, causing discontent of the end-users and complaints to the operator's customer service.

Accordingly, a need exists to avoid at least some of the above-mentioned problems and to optimize the forwarding of media data streams at congested forwarding elements.

SUMMARY

It is an object of the invention to provide an improved method and device for controlling congestion in media forwarding elements in a network.

According to a first aspect, a method, by a control node, is provided for selecting one of a plurality of media forwarding elements in a network for forwarding an additional media data stream by the selected media forwarding element. According to one step of the method, a load message is received from one of the media forwarding elements, the load message containing information about a load level of said media forwarding element and about how media data streams from a first area of the network from which said one media forwarding element receives the media data streams contribute to the load level of said one media forwarding element. The received information is stored in a storage unit of the control node. Furthermore, a setup request for an additional media data stream is received, the setup request requesting a selection of one of the media forwarding elements for the additional media data stream by the control node. One of the media forwarding elements is selected for the additional media data stream taking into account the stored information. For the selection it is checked based on the stored information whether the set up request for the additional media data stream is relating to a media data stream from the first area. If this is the case, i.e. if the additional media data stream is relating to a media data stream from the first area, said one media forwarding element is excluded from the selection of the media forwarding element for the additional media data stream.

The received message contains the information, from where the existing media data streams are received by the media forwarding element, meaning that at least the area is identified which causes the high traffic. As a consequence, the control node can identify at least the area that causes the congestion in the media gateway. When an additionalsetup request for a media stream is received that would result in a media data stream to the media forwarding element from the first area or to the first area, the control node will not select the forwarding element for which the information is stored that there is a certain traffic load from that area.

The selection of said one media forwarding element may be allowed for the additional media data stream when the setup request is relating to media data stream from a second area of the network that is different from the first area.

In this embodiment, the media forwarding element that reports the load situation from the first area can be used for new requests from other destinations. The setup requests will only be rejected for the area that generates the congestion. As a result, there will be fewer end-users affected by situation. When the setup request for the additional media data stream is received, the affected media forwarding element can be removed from the selection mechanism for any new setup attempts received from the same area.

Furthermore, it is possible that the control node transmits a reject message to a flow control entity which controls the media data streams transmitted to said one forwarding element from the first area. The reject message can instruct the flow control entity to reject further setup requests for further media data streams which would result in a further media data stream to said one media forwarding element from the first area to the area controlled by the control node.

Additionally, it is possible that a group of media forwarding elements is provided in the network and the media data streams in the network from the first area are forwarded by one of the forwarding elements of the group. The control node may only transmit the reject message to the flow control entity when the load message is received from all the media forwarding elements of the group. Here, the control node has no other option but to steer the traffic coming from the first area or being sent to the first area as all forwarding elements which forward media data streams transferred to or from the first area report the load message. When the load message is received by the control node, the control node deduces from the received message that the overload situation is present at the forwarding element from which the load message is received. The control node tries to throttle down the traffic received from said first area.

When all media forwarding elements connected to an area are reporting congestion related to the media data stream received from that area, a control node reports the congestion to the flow control entity or to the source of the congestion related to the concerned area with the hope that the relevant flow control entity will reject any call/session attempts which would lead to a further media data stream to the already congested media forwarding elements.

It is furthermore possible that the control node monitors whether a response message is received in response to the transmitted reject message. If it is detected that no response message is received, said one forwarding element is selected only for a part of the future media data streams from the first area wherein said one forwarding element is not used for the rest of the further media data streams from the first area until the load message will stop referring to a significant load contribution due to media data streams received from the first area.

As mentioned above, when the control node receives the load messages or reports from several forwarding elements connected to the same area, the control node will attempt to throttle down the traffic coming from the source of the congestion and inform the flow control entity of the first area about the congestion situation. If the flow control entity controlling the traffic provided to the first area supports the functionality, it shall start rejecting all new call attempts. In case the flow control entity is only a transit node, it shall attempt to relay the congestion or reject message beyond its borders to the next connecting node in the direction of the origin of the traffic/media data stream.

If, however, the flow control entity of the first area does not acknowledge the reject message in which the control node tries to throttle down the traffic, the control node will assume that the functionality is not supported and will begin to steer a certain percentage (which could include 0 as well) of the new incoming requests from the first area. The rest of the traffic will be rejected and the entity can be informed accordingly.

The load message of said one media forwarding element may be received periodically or continuously and the stored information can be updated periodically or continuously. Said one media forwarding element is selected for the additional media data stream from the first area again when the load level of said one media forwarding element is below a predefined threshold. When the reported congestion in the load message drops below a threshold or when the load message is not received any more by the control node, said one forwarding element may be included again in the selection of the media forwarding element for traffic from or to the first area and the stored information concerning the first area is removed.

The load message may contain the information how much each media data stream of the media data streams of the first area contributes to the load level. The received information is stored and said one media forwarding element is selected based on the received information.

The invention furthermore relates to the corresponding control node which comprises a receiver where the load message mentioned above is received. The control node furthermore comprises a storage unit configured to store the received information. A forwarding element selecting module selects the media forwarding elements for the additional media data stream and takes into account the stored information as discussed above.

The receiver may be configured to receive at least a source address from the source node(s) from which said one forwarding element receives the media data streams and the storage unit is configured to store the source address(es). In this example, the received load message does not only specify the first area from which the media data streams are received but directly identifies the source(s) of the media data streams and thus the source(s) of the possible congestion. A transmitter of the control node may be provided which then transmits the reject message directly to the flow control entity controlling the flow of the identified source.

It is possible that other flow control entities controlling the flow of media data streams inside the network or outside the network have the above-described functionality and may send the above-discussed reject message to the control node. Here, the receiver can be configured to receive the reject message from a flow control entity which controls the media data streams received from one of the forwarding elements controlled by the control node. Said one of the forwarding elements transmits media data streams to an area controlled by the flow control entity from which the reject message is received. The reject message instructs the control node to reject further setup requests or further media data streams which would result in a further media data stream of said one media forwarding element to the area controlled by the flow control entity. The control node comprises a transmitter which may transmit an acknowledgement message to the flow control entity and the receiver of the control node is configured to reject the further setup requests for the further media data streams which would result in the further media data stream to the area controlled by the flow control entity.

The media forwarding element can be a media gateway and the control node may be a media gateway controller. However, in another embodiment when the invention is used in connection with an IP multimedia subsystem (IMS), the media forwarding element may be an IMS Media Gateway, an Interconnect Border Gateway Function (I-BCF) or an Access Transfer Gateway (ATGW). In a mobile communication system, the media forwarding element could be a mobile media gateway and in a software-defined network, the media forwarding element could be a simple network device.

The media data stream could be a stream of IP data packets containing media data. The control node can be a media gateway controller or any other controller which controls the forwarding of media streams in the above-mentioned different examples of media forwarding elements.

According to another aspect of the invention, a method for forwarding a media data stream through a network by a media forwarding element is provided. According to one step of the method, at least the first area of the network, form which the media data streams are received, is identified. Additionally, a load level of the forwarding element is identified and how much the media data streams for the first area contribute to the load level of the media forwarding element. A load message is transmitted to the control node which controls the media forwarding element and which selects the media forwarding elements for the different media streams in the network. The load message contains the information about the load level of the media forwarding element and about how much the media data streams from the first area of the network contributes to the load level of the media forwarding element.

The media forwarding element identifies at least the area and informs the control node about the load situation and about the source of the load. The media forwarding element may be able to identify the IP source address(es) (or any other information element used for identification) from a source node from which the first media data stream is received. The IP source (or any other information element used for identification) is then transmitted to the control node in the load message.

The fact whether the media forwarding element transmits the area from which the media data stream is received or directly the source which transmits the media data stream can depend on the fact whether the source of the media data stream is within the same network as the media forwarding element. If this is the case, the media forwarding element may directly identify the source of the media data stream. If the media data stream originates from another network or when the media forwarding element does a transit job, the media forwarding element may only be able to identify the next hop or the next node or the node at the border of the network from where the media data stream is received.

The invention furthermore relates to the corresponding media forwarding element configured to forward the media data stream comprising the source identification module configured to identify at least a first area of the network from which the media data stream is received. A load identification module identifies the load level and how much the media data stream from the first area contributes to the load level of the media forwarding element. The transmitter transmits the load message to the control node via the load message containing the information discussed above.

The media forwarding element may be configured to forward media data streams from different areas of the network. The load identification module can be configured to identify how much the corresponding media data streams from the different areas contribute to the load level of the forwarding element. The transmitter can then transmit a list in the load message to the control node in which it is indicated how much the media data streams from the different areas contribute to the load level of the forwarding element. By way of example, the load message may contain a ranked list of the areas so that the areas forwarding the highest volume of data can be identified.

The invention furthermore relates to a computer program comprising program code to be executed by at least one processing unit of a control node for selecting one of a plurality of media forwarding elements. The execution of the program code causes the processing unit to perform at least some of the steps mentioned above in connection with the control node. The computer program may be provided on a physical medium or may be provided for download.

The congested nodes in a specific area are relieved from further call set-ups thereby enabled to recover from congestion, or due to explicit spreading load over the available remaining nodes, the network is used more efficiently. Furthermore, users will be confronted with less or none rejected setup attempts.

The different features and embodiments mentioned above may be used in the described context. However, it should be understood that each of the features and embodiments described above and the further features and embodiments described below may be used alone or in connection with any of the other features described above or below.

BRIEF DESCRIPTION OF THE DRAWINGS

The invention will be described in further detail with reference to the accompanying drawings.

DETAILED DESCRIPTION OF EMBODIMENTS

In the following, concepts in accordance with exemplary embodiments of the invention will be explained in more detail and with reference to the accompanying drawings.

In the following, the invention will be described in connection with a media gateway controller as a control node and a media gateway as a media forwarding element. However, as mentioned above, the principles could also be applied to other aggregation nodes and is applicable also to IP transport, e.g. in a software-defined network.

A media gateway will identify a first area or directly a source that causes congestion in the media gateway and will inform the control node, the media gateway controller, accordingly so that the media gateway controller can implement, if necessary, a throttling mechanism able to reduce the traffic on the congested media gateway by steering the traffic towards other nodes. As a consequence, the media gateway will be able to recover faster and continue the processing of the ongoing traffic and accept traffic requests from or to other destinations. At the same time, calls/media data streams will be rejected only for the area that generates the congestion. The invention proposes a multistage control mechanism that can ensure a better regulation in the network of the traffic received from a source of a high-volume media data stream. The media gateway can report the congestion's source address and the level of the congestion to the media gateway controller. The media gateway controller can remove the affected media gateway from the media gateway selection mechanism for any new calls or setup attempts received from the source of the congestion. Furthermore, or as an alternative, it can report the congestion and the congested media gateway ID to the source of the congestion. The concerned node should then reject any new session attempts. If the concerned node is not the actual source of the congestion, the report may be passed deeper in the network. The media gateway will recover faster from congestion with minimal or no impact on the traffic handled by the media gateway from other sources. Furthermore, the traffic received from the high-traffic area can be rerouted towards other media gateways. If there is no capacity available in the network to take over the additional traffic, the new sessions/media data flows or a percentage of them will be rejected only in the concerned area.

A media gateway forwarding the media data stream has different ports where traffic from different regions is received of is transmitted to.

Figure 1:
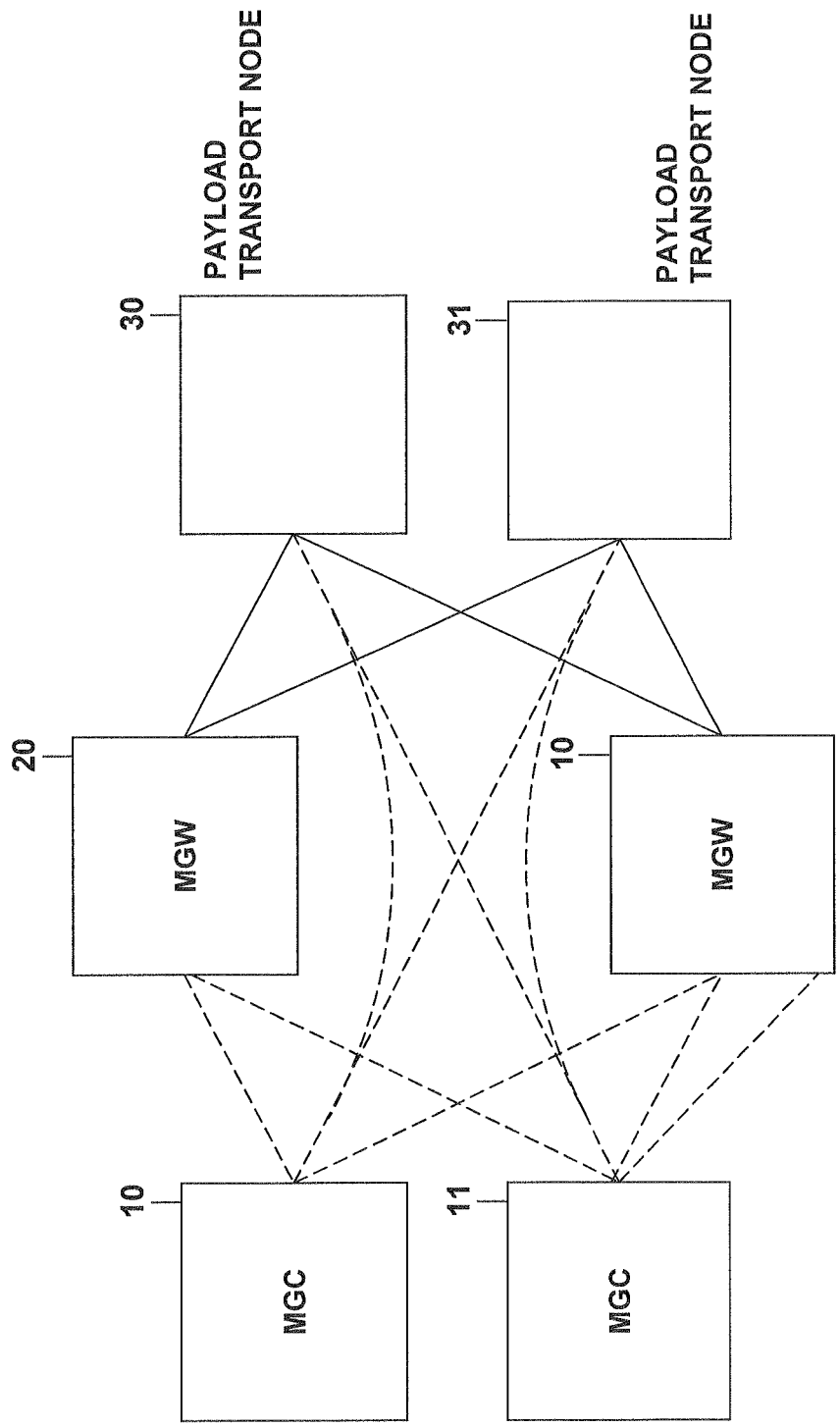
FIG. 1 is a block diagram, illustrating an exemplary network architecture known in the art to transport media data streams in a network.
Figure 2:
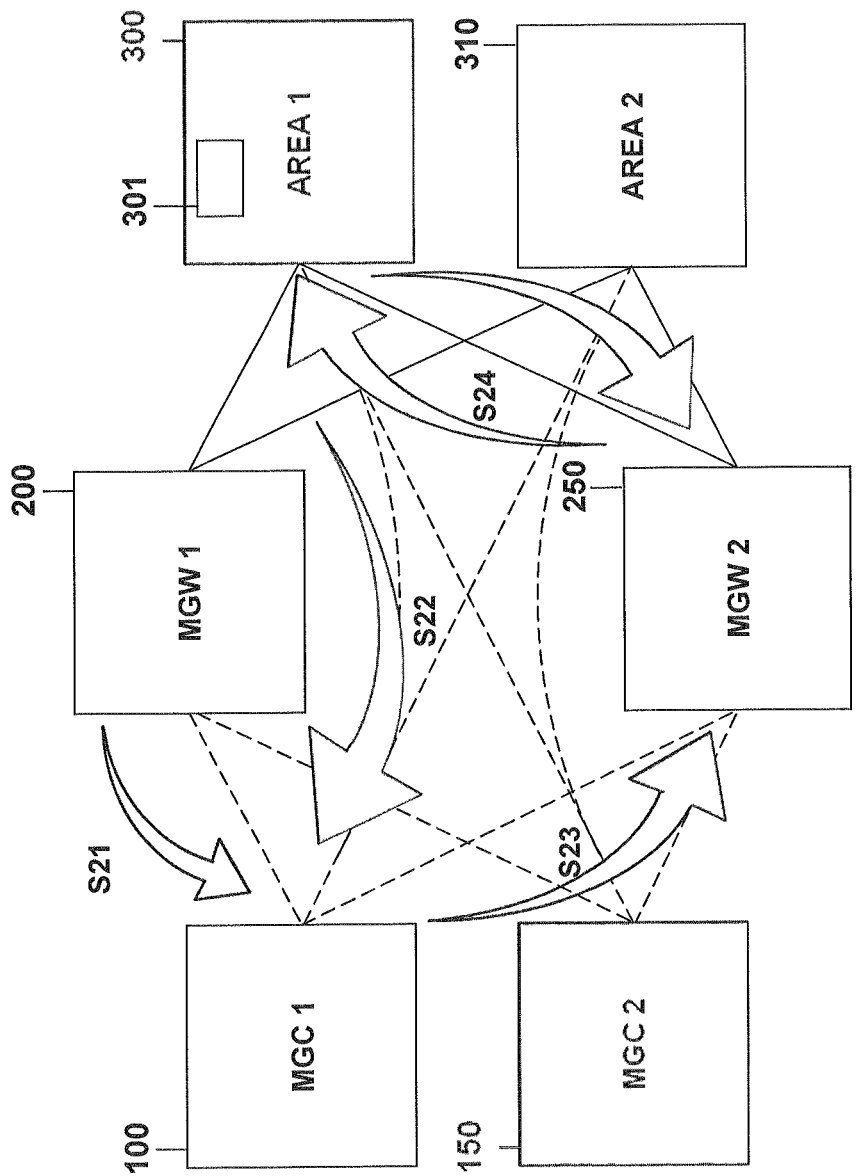
FIG. 2 is a block diagram illustrating a schematic view of a network architecture and a message exchange in accordance with an embodiment of the invention.

In connection with FIG. 2, one possible embodiment of the invention is described. A first media gateway, media gateway 200 identifies and reports to the media gateway controller 100 the source of congestion, here area 1 with the reference numeral 300 and the congestion contribution of that source to the total level of congestion in the node. These reports, also called load messages hereinafter, may be sent periodically until the congestion level drops below a certain acceptable threshold. In another embodiment the load message will only be transmitted when a control node, such as control node 100, 150, selects a media gateway for a media session or only when the media gateway load exceeds a certain predefined threshold.

The media gateway controller 100 analyzes the information received and excludes the selection of media gateway 200 for new call attempts received from the high-traffic area 300. The controller 100 continues to monitor the media gateway 200. When the reported congestion drops below a threshold or when the message is not received any more, the gateway 200 is included again in the media gateway selection process for traffic from the first area 300.

When the media gateway controller receives similar reports from all media gateways 200, 250 connected to the same first area 300, the media gateway controller will attempt to throttle the traffic coming from the source of the congestion and may inform a flow control entity 301 about the congestion situation. The report or reject message will be canceled in the moment the congestion drops below a threshold. This report can trigger two possible actions. When the flow control entity 301 controlling the flow in the first area 300 supports the functionality discussed above and further below, the flow control entity 301 shall start rejecting all new call attempts. The flow control entity 301 can just be a transit node to another network. In this case it shall attempt to forward the reject message beyond its borders to the next connecting node in the correction of the origin of the traffic. When the flow control entity 301 does not acknowledge the traffic throttling message, i.e. a reject message transmitted to the flow control entity instructing the flow control entity to reject further setup requests for further media data streams, the media gateway controller will assume that the functionality is not supported by the flow control entity 301 and will begin to steer a certain percentage of the new incoming connection requests from area 1. The rest of the traffic will be rejected and the flow control entity 301 can be informed accordingly.

In connection with FIG. 2, a message exchange will be discussed in more detail where media gateway 200 reports to all controllers 100, 150 congestion caused by traffic coming from the first area 300. Furthermore, the media gateway controller's behavior for the subsequent requests for traffic handling coming from the first area 300 is discussed. For simplicity, the Figure only depicts the actions related to the media gateway controller 100. In step S21, the media gateway 200 reports the congestion due to traffic received from the first area 300, e.g. by identifying the source IP address in the received media data stream.

Fom MGW point of view one area can be identified by one or more IP addresses. There can be at least two IP interfaces for the transport of the media streams: one active and one standby. Depending of the node/area traffic capacity and the interface capacity, there might me one or more interface pairs used between the area and the MGW. Each pair, depending on the implementation & working mode, has one or two IP addresses. There is only one IP address when the node hides its internal structure to the external world and advertises only one IP address to the outside world or when IP migration function exists in the area/node (if the main interface fails, the IP address of the main interface is moved automatically to the standby interface). Two IP addresses are visible in case both interfaces are visible to the external world or when they work in load sharing mode.

There are also other ways to identify the source of congestion besides the IP address: if the peer node is another MGW (independent of which type), this peer can be identified through its node name—BCUId or MGWId, if the node is an access node, this can be identified also by its CCITT No 7 signaling point code. In other cases, the node can be maybe identified by its URL address if the source of the congestion is directly connected to the MGW, the method as suggested applies. But if the source is not defined as directly connected to the MGW controlled by the MGC, there is a protocol suggested to forward the method deeper into the network. This step S21 is a load message including the information about the load level and about how much the media data streams from the first area contribute to the load level of the media gateway 200. The media gateway controller 100 stores/updates the information and enables traffic steering to other destinations for new requests for handling media data streams from the first area 300. In step S22, a new request for traffic handling arrives at the media gateway controller 100 from the first area 300 a request for an additional media data stream. The media gateway controller checks the stored information received in the load message and based on the fact that traffic steering is enabled for the first area in relationship with media gateway 200, the media gateway controller 100 selects another media gateway, here media gateway 250, to handle the transport of the payload (step S23). As can be seen from step S24, the payload to or from the first area 300 is then handled by the second media gateway 250. This same steering mechanism can also be triggered for traffic requests having the first area 300 as destination.

Figure 3:
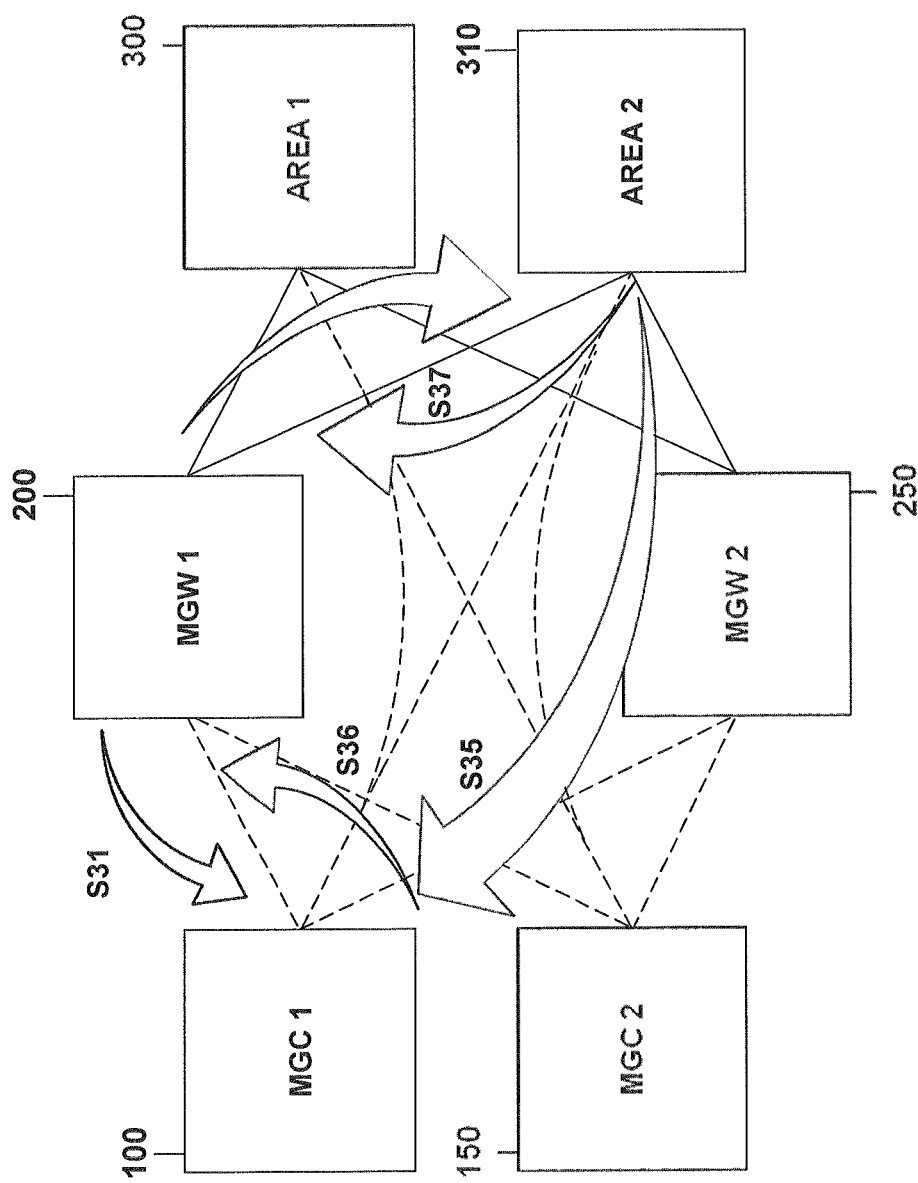
FIG. 3 is a block diagram illustrating the network architecture of FIG. 2 with a message exchange according to a further embodiment of the invention.

In connection with FIG. 3, another embodiment is discussed where the first media gateway 100 reports to all controllers 100, 150 the congestion caused by the traffic coming from the first area 300, while traffic from the second area 310 is handled normally through the first media gateway 200.

In step S31, the media gateway 200 reports the congestion due to traffic received from the first area 300. The control node 100 stores/updates the information and enables traffic steering to other destinations for new requests for handling data traffic received from the first area 300. In step S35, a new request for handling traffic comes from the second area 310.

Based on the fact that traffic steering is not enabled for the second area 310, the first media gateway controllers 100 can select the first media gateway 200 to handle the transport of the payload from or to the second area 310 (step S36). In step S37, the payload from or to the second area is handled by the first media gateway 200.

Figure 4:
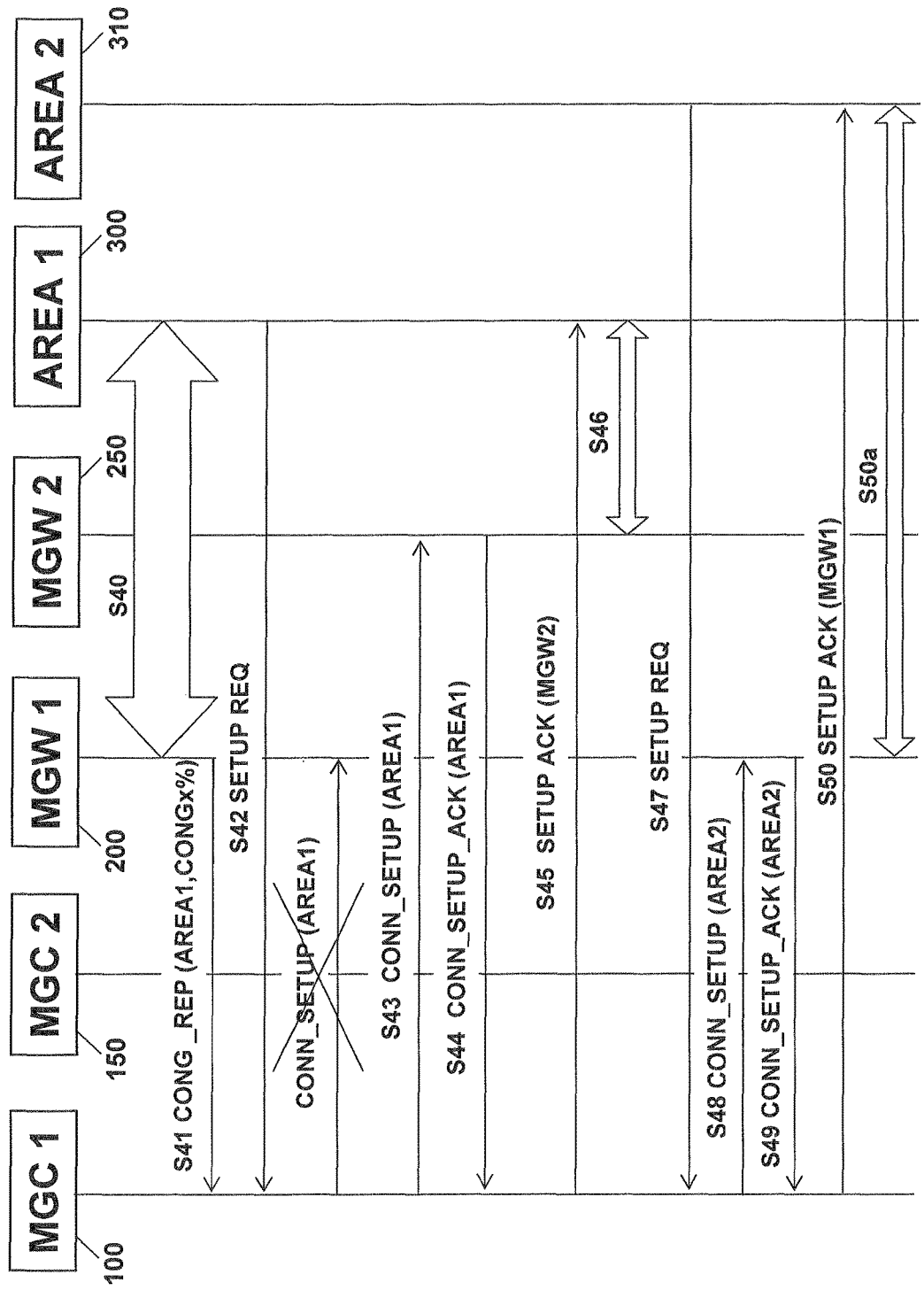
FIG. 4 is a signaling diagram illustrating an example of steering a media stream in the network of FIGS. 2 and 3 according to an embodiment of the invention.

The simplified signaling diagram of FIG. 4 depicts the situation described in the above two cases. In step S41, the load message containing a load level and the congestion contribution (cong %) from the first area is reported to the first media gateway controller for the high load media data stream symbolized in step S40. In step S42, a further setup request is received from the first area at the media gateway controller 100. The media gateway controller has stored/updated the received information received in step S41 and, thus, does not select the first media gateway for the requested additional media data stream. Instead, in step S43, a connection setup request is transmitted the second media gateway 150, the acknowledgement being returned in step S44 to the controller 100. The setup request of step S42 is acknowledged in step S45 to the first area including the ID of the second media gateway so that in step S46 the traffic from area 1 is handled by the second media gateway. If, however, a setup request for a new traffic is received from the second area 310 (S47), the media gateway controller can transmit a connection setup request to the first media gateway (S48) which is acknowledged in step S49. The setup request of step S47 is acknowledged to the second area in step S50 so that the first media gateway can forward the traffic from the second area as symbolized by step S50a.

Figure 5:
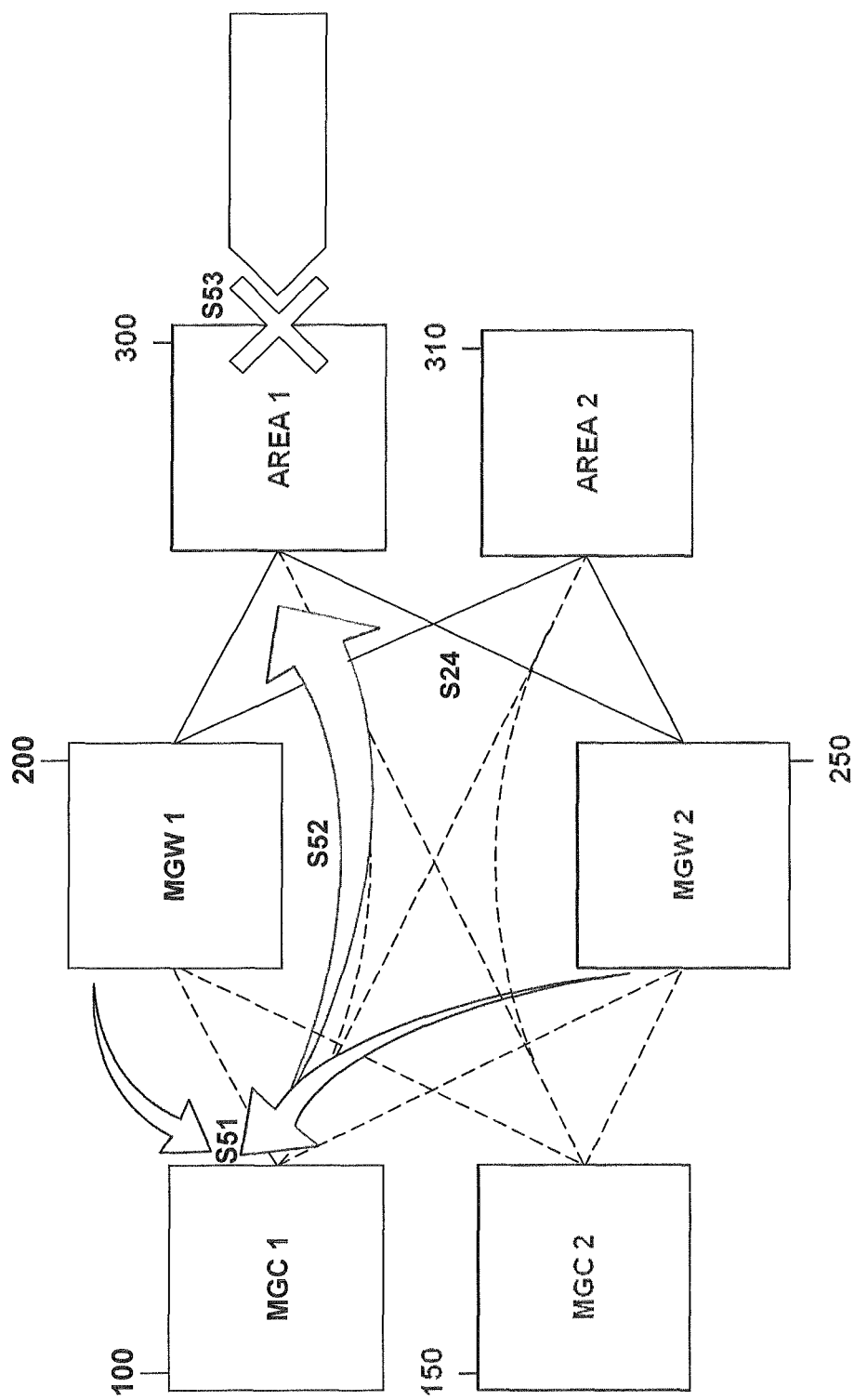
FIG. 5 is a block diagram illustrating the message exchange in the network of FIG. 2 in an embodiment of the invention.

In connection with FIG. 5, an embodiment will be described where all media gateways connected to the first area are reporting a congestion to the media gateway controller 100. In this embodiment a group of media gateways are provided which forward traffic from one area of the network, here the first area 300, and all media gateways of the group report a congestion level. As shown in step S51, all media gateways connected to the first area 300 report the congestion due to traffic received from that area. The controllers 100 (and also 150, although not shown) are storing/updating information and supervise the connections with the media gateway for any new information update regarding the congestion. In step S52, the media gateway controller 100 informs the controller of the first area about the congestion generated from that specific area and requests throttling of the traffic from that area. The controller of the first area (not shown in the Figure) acknowledges the request. The traffic controller of the first area supports the traffic throttling and any new connection request will be rejected until the traffic throttling request on the reject message from the media gateway controller 100 or 150 ceases.

Figure 6:
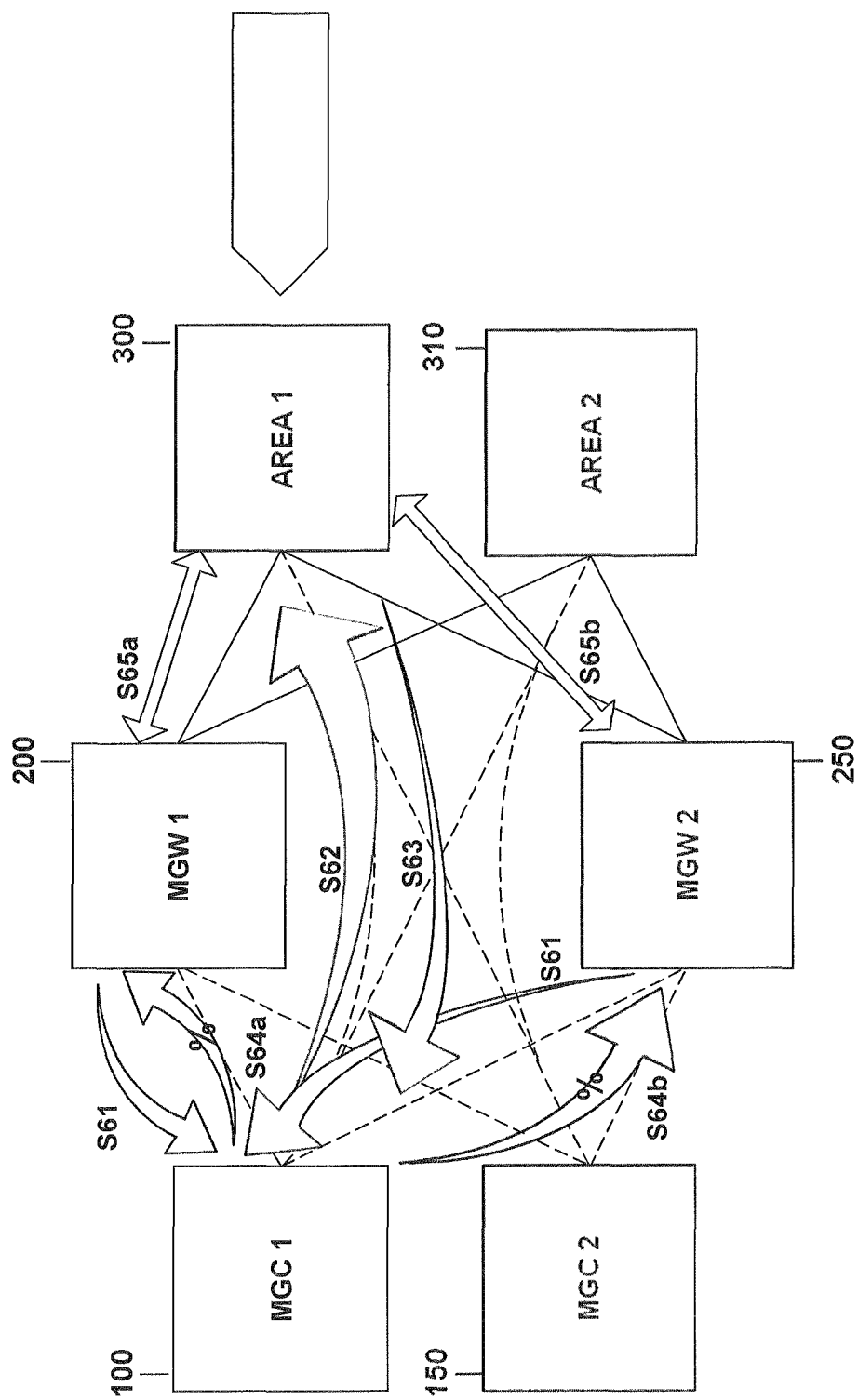
FIG. 6 is a block diagram illustrating a message exchange in the network of FIG. 2 according to another aspect of the invention.

In the embodiment of FIG. 6, the control node of the first area does not support the traffic throttling. As a consequence, the media gateway controllers 150 will steer a certain traffic percentage related to the first area to the first media gateway or the second media gateway while the remaining connection request will be rejected.

In step S61, all media gateways connected to the first area 300 report congestion due to traffic received from that area. The media gateway controllers are storing/updating the received information and supervise the connections with the media gateways for any new information update regarding the congestion. In step S62, the media gateway controller is informing the controller of the first area 300 about the congestion generated from the specific area and requests a throttling of the traffic from that area, but the message is not acknowledged. The media gateway controllers enable traffic steering to other destinations for new requests for handling traffic received from the first area 300. In step S63, a new request for traffic handling comes from the first area 300. In step S64a and S64b, based on the fact that traffic steering is enabled for the first area in relationship with all media gateways, the controller 100 selects the first media gateway 200 or the second media gateway 250 for a certain percentage of the traffic. The remaining connection requests concerning the first area are rejected. As shown in steps S65a and S65b, the payload of the allowed percentage of the traffic from or to the first area is handled by the selected media gateway.

Figure 7:
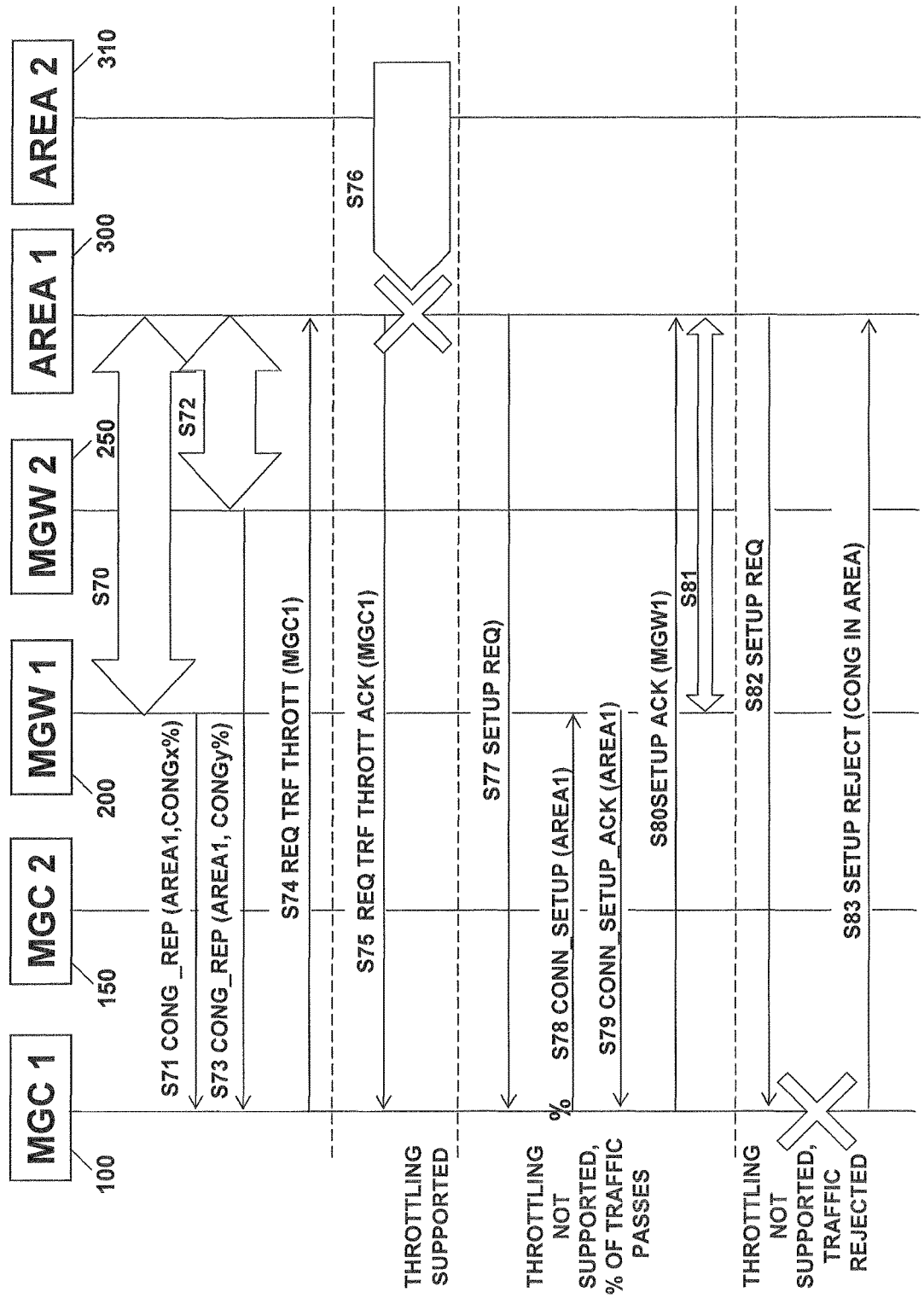
FIG. 7 is a signaling diagram illustrating another example according to another embodiment of the invention.

The situation is summarized in the signaling diagram of FIG. 7. In steps S71 and S73, the load messages are received from the first media gateway and the second media gateway respectively concerning the media data streams shown in steps S70 and S72. As a consequence, the reject message instructing the flow controller of the first area is transmitted to the first area in step S74. As can be seen in step S75, the flow control entity of the first area acknowledges the reject message and rejects further setup requests for traffic to the first area. If, however, the traffic control entity in the first area does not support the throttling, based on the setup request in step S76, the setup request is transmitted to the flow controller in step S77. The first controller then selects the first media gateway for a certain percentage of the traffic (S78) which is acknowledged in step S79 by the first media gateway. This setup is then acknowledged in step S80 to the first area. As a consequence, in step S81, a part of the traffic as allowed by the first controller is handled by the first media gateway from the first area. As indicated in steps S82 and S83, the other part of the request to setup traffic from the first area is rejected.

Figure 12:
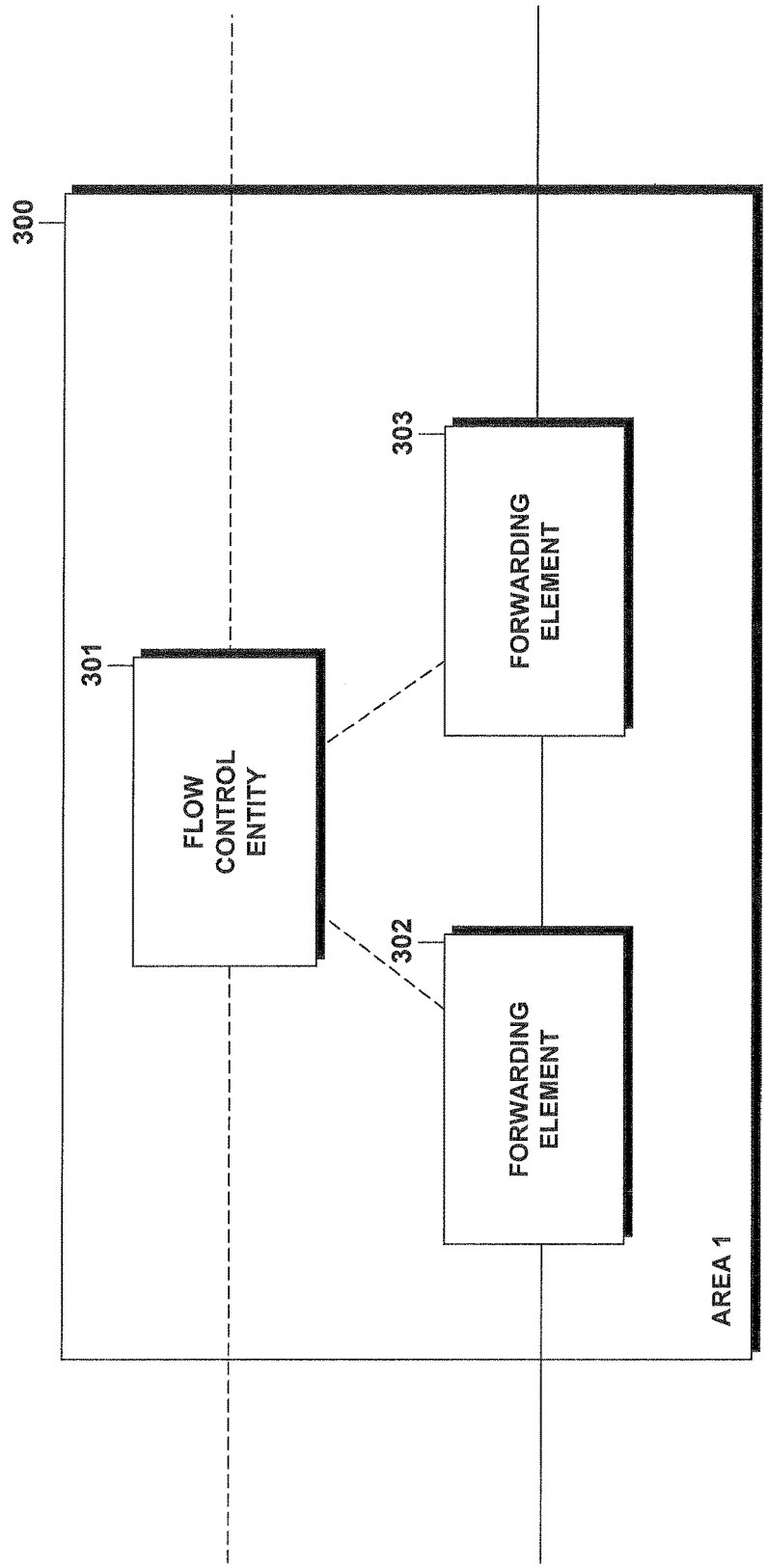
FIG. 12 is a block diagram illustrating a schematic view of the area from which a media data stream causing an overload at a media forwarding element is received.

FIG. 12 schematically shows in more detail the network in the first area. The first area 300 comprises a flow control entity 301, which controls the flow of media data streams in the first area. Furthermore, different forwarding elements 302 and 303 are provided, which forward the media data streams in the first area. By way of example, when the media gateways shown in FIGS. 2 and 3 are located between a radio network controller, RNC, or a base station controller, BSC, the media gateways may be able to directly identify the source address of the source that generates the media data stream. In other situations, the media gateway may not be able to directly identify the source. By way of example, there could be a row of media gateways one connected to the other. In such an example, it may not be possible to directly identify the source. The media gateway then identifies the area where the high-traffic volume originates from and the media gateway controller may then inform the media gateway controller of the area to throttle the traffic. The traffic controller of the first area may then attempt to forward the throttling message beyond its borders to the next connecting node in the direction of the origin of the traffic. The first area can be or can not be part of the network in which the control nodes 100, 150 are located. The network may be a telecommunications network in the sense that is a collection of entities belonging to the same or multiple operating organizations grouped on four main layers: a media transport layer, a media control layer, an application layer and a management layer. The current invention is referring only to the first two layers and it does not interact with the application layer and will require management layer for the operational (configuration, management, maintenance) aspects.

Figure 8:
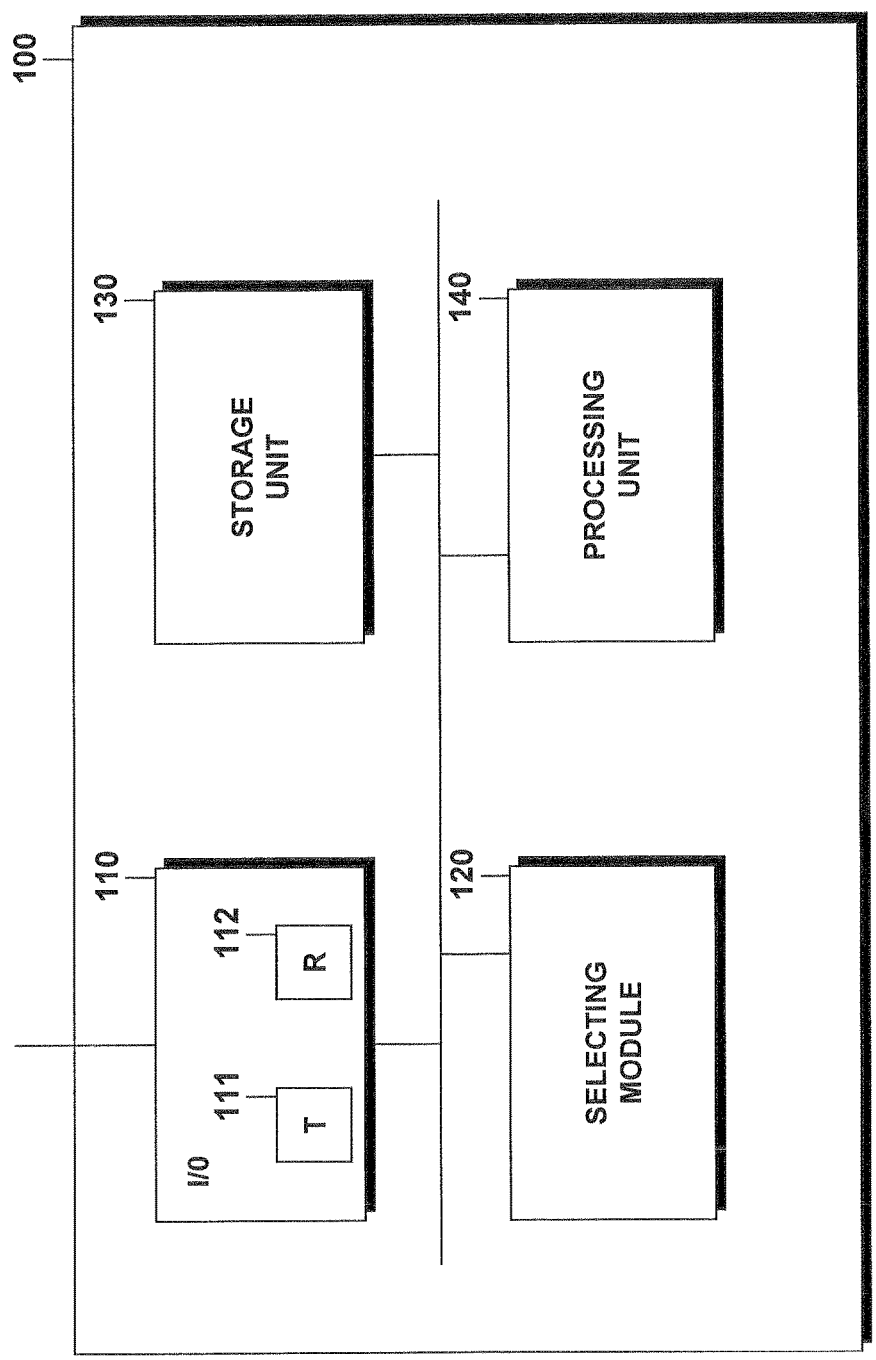
FIG. 8 is a block diagram illustrating a control node used to select a media forwarding element incorporating features of the invention.
Figure 9:
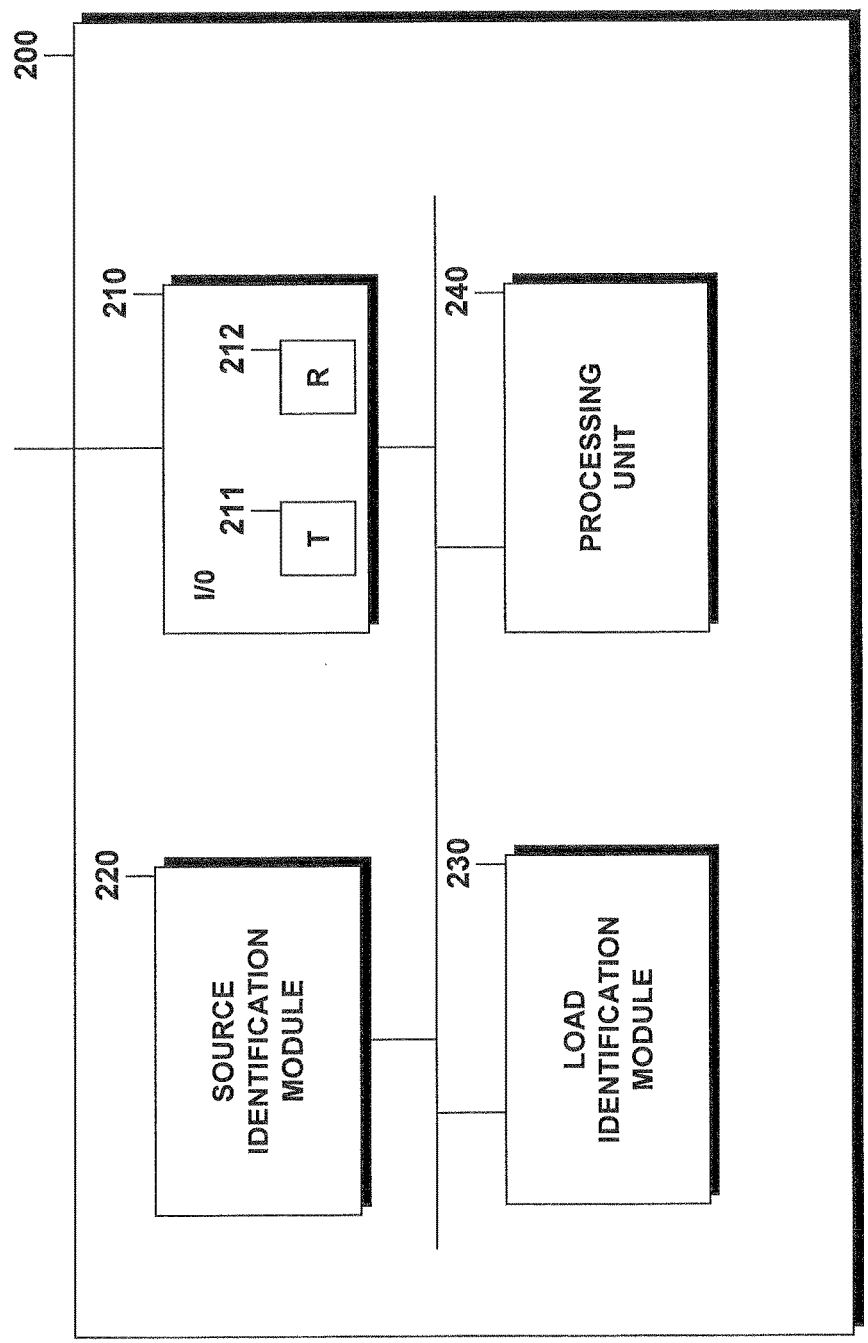
FIG. 9 is a block diagram illustrating a media forwarding element identifying at least an area from which a media data stream is received incorporating features of the invention.

In connection with FIGS. 8 and 9, a schematic view of a media gateway controller and a media gateway which are used in the examples above are explained in more detail. For the sake of clarity, only the functional units or modules are shown which are necessary for the understanding of the invention. It should be understood that the described nodes may comprise further functional modules. Furthermore, the different modules need not necessarily be provided in the explained separation of modules. Different functions may be implemented in other ways. Furthermore, the functional modules may be implemented by hardware or software or by a combination of hardware and software.

The media gateway controller 100, as an example for one of the media gateway controllers 100, 150, comprises an input/output unit 110 with a transmitter 111 configured to transmit data and messages to other nodes in the network, a receiver 112 being provided for the reception of messages from other nodes. It should be understood that different protocols and interfaces may be used for the connection with other nodes of the network. A forwarding element selecting module 120 is provided, which selects one of the media gateways when a setup request for a media data stream is received. In a storage unit 130, the congestion reports or load messages received from the media gateways may be stored. The selecting module 120 accesses the information in the storage unit 130 then checks, when a new setup is received, whether a congestion exists for the traffic from or to the area for which the setup request is received. In the affirmative, the selecting module will select another gateway to forward the requested traffic. A processing unit 140 may control the functioning of the media gateway controller.

In FIG. 9, a media gateway 200 is shown comprising an input/output unit 210 with a transmitter 211 and a receiver 212. The transmitter and receiver may be used for communication with media gateway controller 100 and may be used to forward media data streams to other media gateways. Again, as in FIG. 8, the input/output unit 210 symbolizes the possibility to communicate with other nodes inside and outside the network. The source identification module 220 identifies the source from which a media data stream forwarded by the gateway is received. As mentioned above, the source identification module 220 may directly identify the source of the traffic or may only identify the area from which the traffic is received. A load identification module 230 identifies the load level of the media gateway and identifies how much the media data streams from a certain area contribute to the load level of the media gateway. As the media gateway may be able to handle traffic from different areas, the load identification module 230 may be able to identify how much the different media streams from different areas contribute to the load level so that the load identification module can generate a list to be included into the load or congestion message sent to the media gateway controller. The list can indicate how much each of the media streams from different areas contributes to the load level.

The media gateway controller 100 can then use this information to identify the media data stream that generates the congestion. If no load messages are generated by the load identification module 230, the media gateway controller can deduce therefrom that the congestion is below a certain threshold. A processing unit 240 can control the functioning of the media gateway. The processing unit 240, as processing unit 140 may have multiple processors with one or more cores or may be a single processor with multiple cores.

Figure 10:
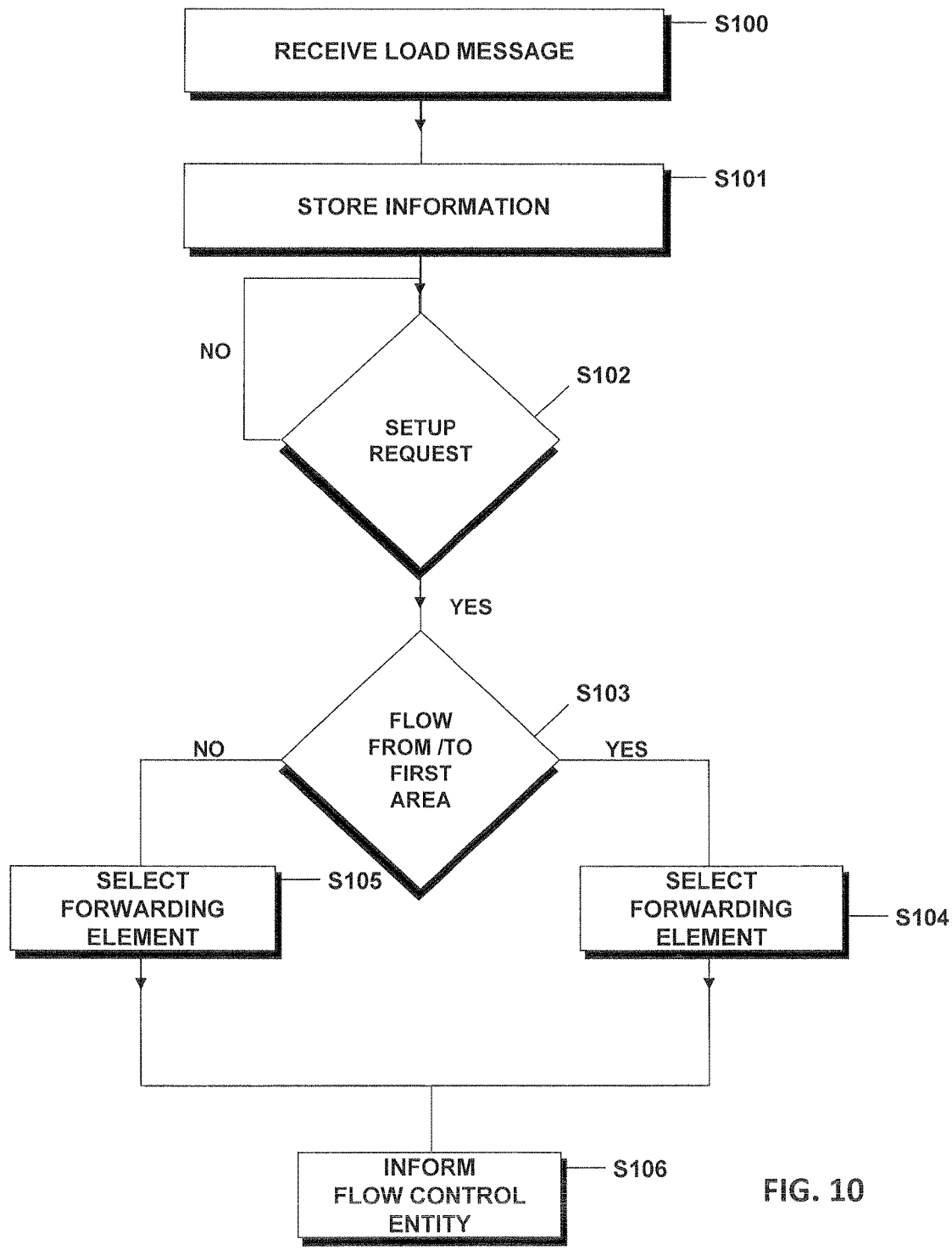
FIG. 10 is a flowchart illustrating a method for selecting a media forwarding element according to an embodiment of the invention.
Figure 11:
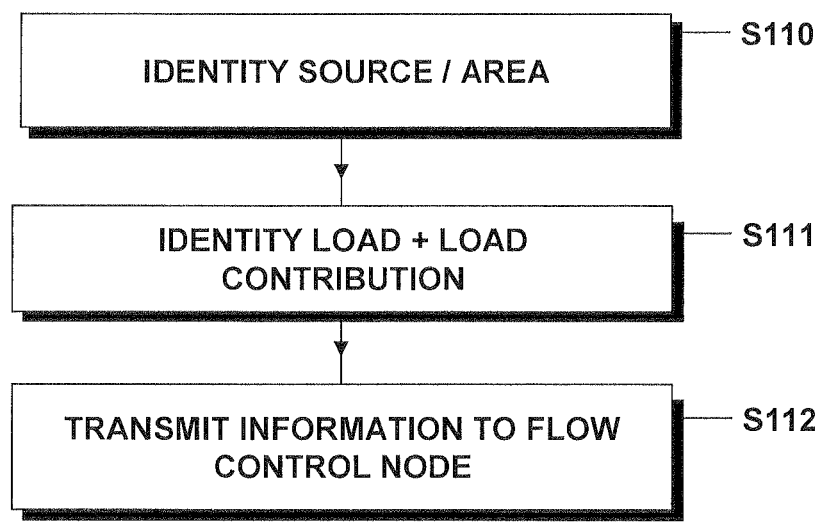
FIG. 11 is a flowchart illustrating a method for informing a control node of the load and of the load distribution in a media forwarding element according to an embodiment of the invention.

In FIGS. 10 and 11, the steps carried out by the media gateway controller or media gateway are summarized. In FIG. 10, the steps carried out by the media gateway controller when selecting a media gateway for a media data stream is selected, are summarized. In step S100, the load message is received from one of the media gateways. In step S101, the controller stores the information contained in the load message in the storage unit. This stored information is then used later on to determine whether media data streams from the same area as contained in the stored load message are accepted for the media gateway from which the load message is received or not. In step S102, it is checked whether a setup request for a further, second media data stream is received. If this is the case, it is checked in step S103 by accessing the storage unit 130 whether the request for the second media data stream relates to a flow to or from the first area, the area mentioned in the received load message. If this is not the case, any of the media gateways may be selected in step S105, e.g. a media gateway from which the load message was received in step S100. If, however, it is determined in step S103 that the request is for a flow from or to the first area, the media gateway is selected in step S104, and in this selection the media gateway from which the load message was received in step S100 is excluded. In the embodiment shown in FIG. 10, the flow control entity which controls the forwarding elements in the first area is informed that a high load is generated at the media gateways through the traffic coming from the first area. The information can be a reject message requesting the flow control entity to reject further flows that would lead to a traffic to the media gateway from the first area. In the embodiment shown in FIG. 10, this reject message is already sent when the load message is received from one of the media gateways. However, as discussed above in connection with FIGS. 5 and 6, step S106 may be only carried out when all the media gateways for a group handling traffic from a first area report a congestion in the form of a load message to the media gateway controller.

In connection with FIG. 11, the main steps carried out by the media gateway are discussed. In step S110, the source of a media data stream can be determined, e.g. by identifying a source IP address in a header of an IP data packet contained in the media stream. In step S111, the load of the media gateway is determined and the load contribution meaning how much the identified media data stream from the identified area contributes to the load level of the media gateway. This information is then transmitted to the control node, the media gateway controller in step S112.

The congested nodes in a specific area are relieved from further call set-ups thereby enabled to recover from congestion. Due to explicit spreading load over the available remaining nodes, the network is used more efficiently. Additionally, users will be confronted with less or none rejected setup attempts.

The load messages transmitted to the media gateway controller may be sent periodically at certain intervals or the sending of the load message may be triggered when a request is received to handle a media data stream. The media data stream may contain audio and or video media data.

The invention claimed is:

1. A method, by a control node, for selecting one of a plurality of media forwarding elements in a network for forwarding an additional media data stream by the selected media forwarding element, the method comprising the steps of:
   receiving a load message from one of the media forwarding elements, the load message containing information about a load level of said one media forwarding element and about how media data streams from a first area of the network from which said one media forwarding element receives the media data streams contribute to the load level of said one media forwarding element;
   storing the received information in a storage unit of the control node;
   receiving a setup request for an additional media data stream, the setup request requesting a selection of one of the media forwarding elements for the additional media data stream by the control node;
   selecting one of the media forwarding elements for the additional media data stream taking into account the stored information, wherein, for the selection, it is checked based on the stored information whether the set up request for the additional media data stream is relating to a media data stream from the first area, wherein, if the additional media data stream is relating to a media data stream from the first area, said one media forwarding element is excluded from the selection of the media forwarding element for the additional media data stream.

2. The method according to claim 1, wherein the selection of said one media forwarding element is allowed for the additional media data stream when the setup request is relating to a media data stream from a second area of the network that is different from the first area.

3. The method according to claim 1, further comprising the step of transmitting a reject message to a flow control entity which controls the media data streams transmitted to said one forwarding element from the first area, the reject message instructing the flow control entity to reject further setup requests for further media data streams which would result in a further media data stream to said one media forwarding element from the first area to the area controlled by the control node.

4. The method according to claim 3, wherein a group of media forwarding elements is provided in the network and media data streams in the network from the first area are forwarded by one of the forwarding elements of the group, wherein the reject message is only transmitted to the flow control entity when the load message is received from all media forwarding elements of the group.

5. The method according to claim 3, further comprising the step of monitoring whether a response message is received in response to the transmitted reject message, wherein, when it is detected that no response message is received, said one forwarding element is selected only for a part of the further media data streams from the first area, wherein said one forwarding element is not used for the rest of the further media data streams from the first area.

6. The method according to claim 1, wherein the load message of said one media forwarding element is received continuously or periodically and the stored information is updated continuously or periodically, wherein said one media forwarding element is selected for the additional media data stream from the first area again when the load level of said one media forwarding element is below a predefined threshold.

7. The method according to claim 1 wherein the received load message contains the information how much each media data stream of the media data streams of the first area contributes to the load level, wherein the received information is stored and said one media forwarding element is selected based on the received information.

8. A method, by a media forwarding element, for forwarding an additional media data stream through a network, the method comprising the steps of:
   identifying at least a first area of the network from which media data streams are received;
   identifying a load level of the media forwarding element;
   identifying how the media data streams from the first area contribute to the load level of the media forwarding element; and
   transmitting a load message to a control node which selects the media forwarding elements for the different media data streams in the network, wherein the load message contains the information about the load level of the media forwarding element and about how the media data streams from the first area of the network contribute to the load level of the media forwarding element.

9. The method according to claim 8, wherein the at least one IP source address or other information element able to identify a source node, from which the media data streams are received, is identified and transmitted in the load message to the control node.

10. A control node configured to select one of a plurality of media forwarding elements in a network for forwarding an additional media data stream by the selected media forwarding element, the control node comprising:

a receiver configured to receive a load message from one of the media forwarding elements, the load message containing information about a load level of said one media forwarding element and about how media data streams from a first area of the network from which said one media forwarding element receives the media data streams contribute to the load level of said one media forwarding element, the receiver being further configured to receive a setup request for an additional media data stream, the set up request requesting a selection of one of the media forwarding elements for the additional media data stream by the control node;

a storage unit configured to store the received information; and processing circuitry operative as a forwarding element selecting module configured to select the media forwarding elements for different media data streams in the network;

wherein, when the receiver receives the set up request for the additional media data stream, the forwarding element selecting module is configured to select one of the media forwarding elements for the additional media data stream taking into account the stored information, wherein for the selection the forwarding element selecting module checks based on the stored information whether the set up request for the additional media data stream is relating to a media data stream from the first area, wherein, if the additional media data stream is relating to a media data stream from the first area, the forwarding element selecting module is configured to exclude said one media forwarding element from the selection of the media forwarding element for the additional media data stream.

11. The control node according to claim 10, wherein the forwarding element selecting module is configured to allow the selection of said one media forwarding element for the additional media data stream if the setup request is relating to media data stream from a second area of the network that is different from the first area.

12. The control node according to claim 10, wherein the receiver is configured to receive the source address or other information element able to identify a source node from which said one forwarding element receives the media data streams, and wherein the storage unit is configured to store the received source address or other information element able to identify the source node.

13. The control node according to claim 10, wherein the receiver is configured to receive a reject message from a flow control entity which controls the media data streams received from one of the forwarding elements controlled by the control node, said one of the forwarding elements transmitting media data streams to an area controlled by the flow control entity, the reject message instructing the control node to reject further setup requests for further media data streams which would result in a further media data stream of said one media forwarding element to the area controlled by the flow control entity, the control node comprising a transmitter configured to transmit an acknowledgment message to the flow control entity, and wherein the receiver is configured to reject the further setup requests for further media data streams.

14. A media forwarding element configured to forward a media data stream through a network, the media forwarding element comprising:

processing circuitry operative as a source identification module configured to identify at least a first area of the network from which media data streams are received;

processing circuitry operative as a load identification module configured to identify a load level of the media forwarding element and configured to identify how the media data streams from the first area contribute to the load level of the media forwarding element; and a transmitter configured to transmit a load message to a control node which selects the media forwarding elements for the different media data streams in the network, wherein the load message contains the information about the load level of the media forwarding element and about how the media data streams from a first area of the network contribute to the load level of the media forwarding element.

15. The media forwarding element according to claim 14, wherein the media forwarding element is configured to forward media data streams from different areas of the network, wherein the load identification module is configured to identify how much each corresponding media data stream from the different areas contribute to the load level of the forwarding element, the transmitter being configured to transmit a list in the load message to the control node, the list indicating how much each of the media data streams from the different areas contributes to the load level of the forwarding element.

16. A non-transitory computer-readable medium storing a computer program comprising program instructions that, when executed by processing circuitry in a control node associated with a network having a plurality of media forwarding elements, configures the control node for selecting one of the plurality of media forwarding elements, said computer program comprising program instructions to configure the control node to:

receive a load message from one of the media forwarding elements, the load message containing information about a load level of said one media forwarding element and about how media data streams from a first area of the network from which said one media forwarding element receives the media data streams contribute to the load level of said one media forwarding element;

store the received information in a storage unit of the control node;

receive a setup request for an additional media data stream, the setup request requesting a selection of one of the media forwarding elements for the additional media data stream by the control node; and select one of the media forwarding elements for the additional media data stream taking into account the stored information, wherein, for the selection, it is checked whether the set up request for the additional media data stream is relating to a media data stream from the first area, wherein, if the additional media data stream is relating to a media data stream from the first area, said one media forwarding element is excluded from the selection of the media forwarding element for the additional media data stream.

* * * * *